(12) United States Patent
Volkoff et al.

(10) Patent No.: US 8,015,220 B1
(45) Date of Patent: Sep. 6, 2011

(54) BLOCK-BASED DIFFERENCING ALGORITHM

(75) Inventors: Serge Volkoff, San Bruno, CA (US); Mark Armour, Corvallis, OR (US); Darryl Lovato, Royal Oaks, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 373 days.

(21) Appl. No.: 12/186,469

(22) Filed: Aug. 5, 2008

(51) Int. Cl.
*G06F 17/30* (2006.01)
(52) U.S. Cl. .................. 707/821; 707/693; 707/802
(58) Field of Classification Search .................. 707/802, 707/803, 693, 821
See application file for complete search history.

(56) References Cited

U.S. PATENT DOCUMENTS

| | | | |
|---|---|---|---|
| 6,925,467 B2 * | 8/2005 | Gu et al. | 1/1 |
| 7,392,260 B2 * | 6/2008 | Ren et al. | 707/752 |
| 2005/0234997 A1 * | 10/2005 | Gu et al. | 707/104.1 |

* cited by examiner

*Primary Examiner* — Cheryl Lewis
(74) *Attorney, Agent, or Firm* — Craig M. Stainbrook; Stainbrook & Stainbrook, LLP

(57) ABSTRACT

A system and method for a block based differencing algorithm which includes the ability to limit memory requirements regardless of source file sizes by splitting the source file into optimally sized blocks. The invention allows the blocks to be processed in any order allowing in-place operation. Further, the present invention allows a second stage compressor to match the compressor blocks to those used by the differencing algorithm to optimize compressor and decompressor performance.

9 Claims, 3 Drawing Sheets

BLOCK-BASED DIFFERENCING ALGORITHM

CROSS REFERENCES TO RELATED APPLICATIONS

Not applicable. The present application is an original and first-filed United States Utility Patent Application.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to data compression and archiving, file differencing, and patching. More particularly the present invention relates to a system and method for improved differencing on very large files. Still more particularly, the present invention relates to a method to perform the differencing algorithm over blocks of the target file, generating patch blocks in the process.

2. Discussion of Related Art including information disclosed under 37 CFR 1.97, 1.98

Current differencing technology, which is typically implemented in "differs", "delta coders", "delta encoders", "updaters", "patchers" and the like, has been available in various forms for some time. The present invention advances the state of the art by processing data incrementally and in an optimal order, thereby producing smaller update packages while using less memory.

Delta/differencing technology solves the need of device and software manufacturers, as well as information providers, to update software, operating systems and related data in the most efficient manner possible. The primary purpose of delta/differencing technology is to reduce the large bandwidth and space/storage costs associated with distributing updated data to existing users of devices, software and data. It does so by using a very efficient process in which only the differences between the old and new data or code are stored and or transmitted.

Differencing algorithms are designed to generate small patch files for similar, potentially very large source and target file pairs. Differencing algorithms benefit from having more source data available for referencing during their operation. In a typical application, patch data is a continuous stream applied in one operation. However, this can be problematic when memory available during patch application is limited.

Accordingly, to ensure that a patch application can be performed on arbitrarily large files in limited memory situations, the present invention provides a block-based differencing system and method that operates on blocks of the target file, generating independent patch blocks in the process. Block size is adaptive and is determined by the following three factors: First, maximum block size is imposed, and that size is based on the memory requirements of the patching algorithm and the desired upper limit on memory consumption. Second, when the number of source file blocks is small, it is beneficial to determine block boundaries in a way that makes all patch blocks equally or similarly sized. When patch blocks are compressed, this avoids inefficient compression of small blocks (the initial learning curve of the adaptive compressor). And third, when the number of source file blocks is large, the last few blocks are made equally or similarly sized, providing an effect similar to the one above.

Additionally, differencing algorithms perform best when their counterpart patching algorithms are allowed to reference the entire source file and the portions of the target file partially reconstructed during patching. On a device where the patching algorithm is executed, this requires enough memory space to accommodate both the source and the target file. Some situations (mobile and other low-end devices using flash memory) require patching to be performed in place because there is not enough memory for both the source and the target files.

Accordingly, the patching algorithm of the present invention divides the target file into blocks, which are processed independently. Each block carries its size and position in the target file, and blocks are put in place one at a time by the patching algorithm. During patching, each patch block is allowed to reference any part of the partially processed source/target file. Blocks can be processed in any order.

The order of block processing by the patch process is selected by the differencing algorithm with the goal of minimizing the sum of the sizes of patch blocks, by either heuristic rules or by exhaustive ordering search to ensure optimization.

Accordingly, the inventive differencing algorithm takes advantage of the incremental nature of patch generation by optimizing its search algorithm. Search data structures used to locate matching portions of the source and the target are updated incrementally, upon completion of each patch block.

Additionally, prior art differencing algorithms typically contain a built-in logic that results in smaller output. However, size reduction achieved this way is less than optimal. In the implementation of the present invention, a separate compression step is applied. In that step a universal compressor is employed.

Accordingly, for differencing followed by a separate compression stage, it is important to match the properties of the compressor to the properties of the differencing output. The optimal combination is achieved when a block-based compression algorithm (such as BWT) operates on entire patch blocks, thus ensuring that there is no misalignment of blocks and no compression loss.

BRIEF SUMMARY OF THE INVENTION

The present invention is a system and method of creation of block-based patch files for the purpose of transforming (updating) source files into target files. The system and method, when applied to a set of source and target file pairs, employs the following method steps:

Encoding (differencing of source and target file pairs, creation of a patch file): The first steps in the inventive system comprise an encoding stage. In the encoding stage, patch block size is first determined. The size is based on the amount of memory specified for differencing and/or patching operations. In performing this step, maximum differencing-side block size is a function of the amount of memory, which is the maximum of the differencing algorithm memory requirement and the compression algorithm memory requirement. Maximum patching-side block size is a function of the amount of memory, which is the maximum of the decompression algorithm memory requirement and the patching algorithm memory requirement. And maximum block size B is the minimum of the differencing-side block size (discussed in this paragraph, supra) and the patching-side block size (supra).

Additionally, in the encoding stage, individual target files are divided into blocks of size B, with the exception of the last few blocks, the sizes of which are equalized to prevent an occurrence of a small partial block at the end of the patch data.

In an ordering step, the ordering of patch blocks is determined either heuristically or optimally. Ordering algorithms depend on whether there is sufficient space for both source and target file during patching and will produce results that significantly differ depending on the data being differenced. Ordering is especially important when patching must be performed in place.

Patch blocks are generated in the order established in the ordering step. Each block contains its position in the target file, size, and patch data. Blocks are transmitted to a compressor as they are being created.

During encoding, search data structures (such as hash, tree, or suffix array) are adjusted to reflect new combined source/target data upon completion of each block. The compressor processes patch data in increments of one or more blocks, based on the amount of memory available for its operation.

Decoding (decompression of the patch file, patching of source files): The second set of steps in the inventive system comprise a decoding stage. In this stage of the algorithm, the decompressor reads the patch file, decodes the data, and generates patch blocks in increments of one or more blocks, based on the amount of memory available for its operation.

During decoding, the patcher first obtains patch block size and location in the target file. Next the patcher interprets patch data in order to reconstruct the target file while using parts of the source and/or target file as references. Each target block is fully reconstructed before it replaces its corresponding source block.

In the case of limited memory available for differencing and/or patching, the above method ensures that differencing and patching can be applied to infinitely large files or sets of files, with minimal loss of performance due to memory limitations.

It is therefore a principal object of the present invention to provide a new and improved system and method to difference and patch data.

It is another object of the present invention to provide a method to avoid sub-optimal patch block sizes to avoid a performance penalty during compression of patch data.

It is another principal object of the present invention to provide a new and improved method of differencing and ordering patch blocks to optimize performance when only in-place patching can be performed.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not reside in any one of these features taken alone, but rather in the particular combination of all of its structures for the functions specified.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Referring to FIGS. 1 through 9, there is illustrated therein a new and improved method for perform a differencing algorithm over blocks of a target file.

Definitions: As used herein, the term "file" means a named set of data elements stored in machine readable form, which may exist in several forms, including in a discrete form, or combined or stored with other files, or embedded in another file as a file or as an object, or as a file containing other files, or as a data stream of a determinate size, including information transmitted over a data channel.

Figure 1:
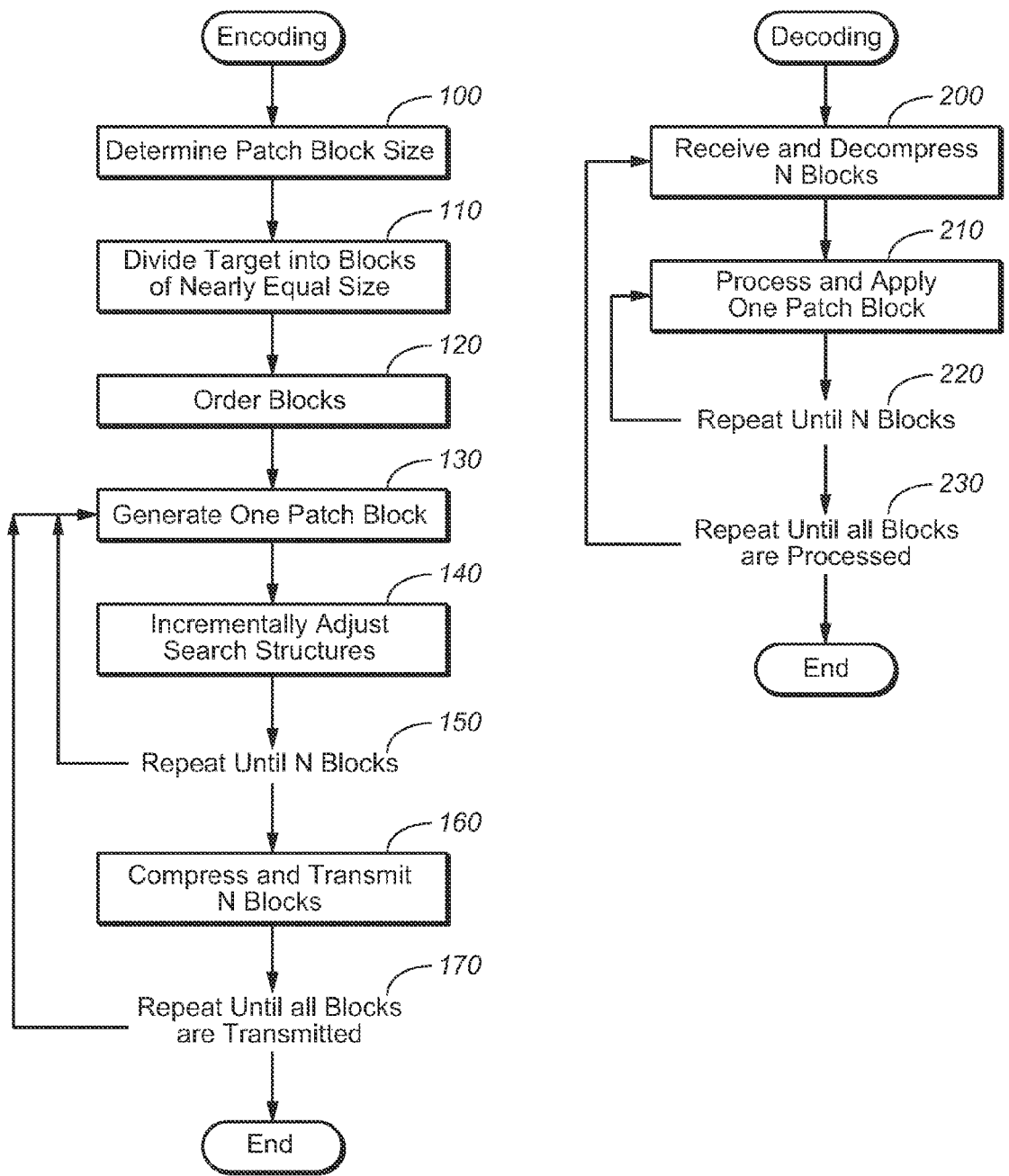
FIG. 1 is a schematic flow diagram illustrating the general functional elements of the present invention's encoding and decoding operations.

Referring first to FIG. 1, during the encoding process, the first step 100 is to determine patch block size, followed by block size equalization 110. Blocks are then ordered in step 120 with the goal of minimizing the sum of the sizes of all blocks. The algorithm then enters the iterative stage wherein one patch block in generated at a time 130, in the order determined in step 120. Each block generation is followed by an incremental update of search structures 140. Block generation 130 and structure update 140 are repeated 150 until a group of N (N≧1) blocks is accumulated. Each group of N blocks is then compressed and transmitted 160. The process is repeated 170 until all blocks of the target file have been processed and transmitted.

The decoding process is the reverse of the encoding process. Groups of N (N≧1) blocks are received and decompressed 200. Each patch block is processed and applied to the partially reconstructed target file 210. The process is repeated 220 for each block and each group of N blocks until all blocks 230 have been received and processed.

Figure 2:
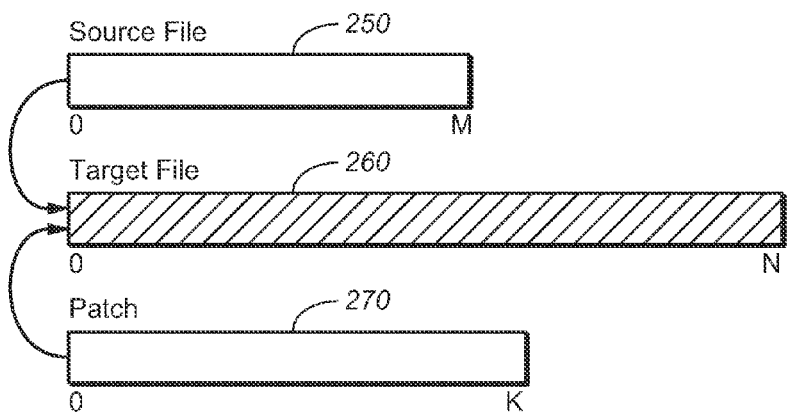
FIG. 2 graphically shows the typical memory usage of prior art differencing technologies with respect to increasing file size.

Referring next to FIG. 2 there is shown a prior art method used in contemporary differencing algorithms. Such algorithms process a source file 250 of M bytes, transforming the source file into a target file 260 of N bytes by application of a patch 270 of K bytes.

Figure 3:
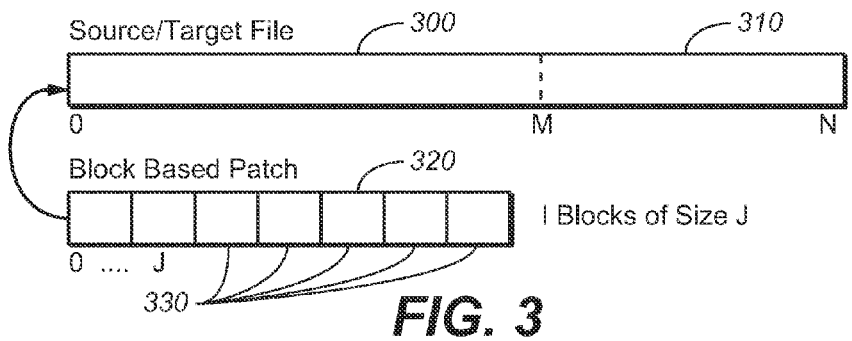
FIG. 3 is a schematic block diagram showing the memory usage of the present invention.

The presently inventive method of using blocks, however, as shown in FIG. 3, processes a source file 300 of Mbytes, transforming it into a target file 310 of N bytes by application of a block-based patch 320 consisting of I compressed patch blocks 330 of size J each. In combination with an in-place update mechanism, the method of the present invention reduces patch memory requirements from N+M+K to N+J, where J<<K and J<<N.

Figure 4:
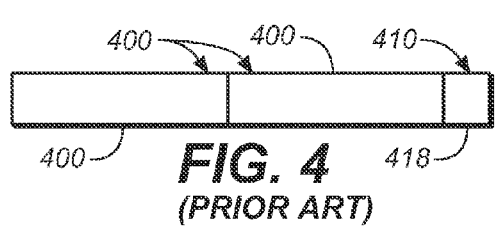
FIG. 4 is a schematic block diagram showing a prior art block size strategy.

Referring now to FIG. 4, there is shown the prior art method of using a fixed size block 400, which typically results in a small "leftover" block 410. This small block is suboptimal as it results in inefficient compression due to the initial learning curve of the adaptive compressor.

Figure 5:
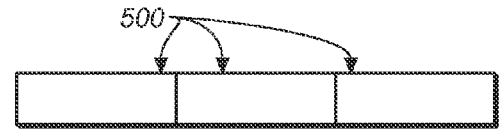
FIG. 5 schematically shows the block size strategy of the present invention.

The present invention, shown schematically in FIG. 5, avoids the loss of small leftover blocks in relatively small files by dynamically adjusting the block size to result in equally sized blocks 500 and no small leftover blocks. Further, for large source file sizes, the present invention uses the maximum block size for all but the last few blocks which are adjusted such that they are equally size with no small leftover block.

Figure 6:
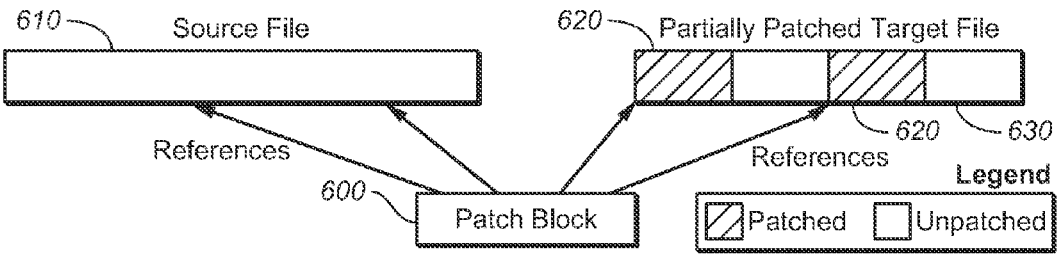
FIG. 6 is a schematic block diagram showing a prior art referencing method using continuous differencing.

Referring next to FIG. 6, there is shown the prior art referencing mode. This figure shows continuous differencing in which the patching algorithm 600 references both the entire source file 610 and the portions 620 of the target file 630 partially reconstructed during patching.

Figure 7:
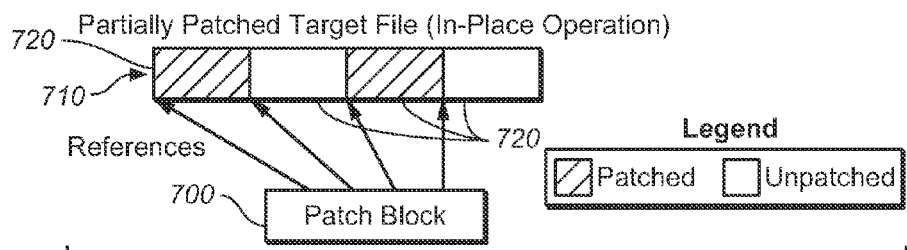
FIG. 7 schematically shows the block-based differencing of the present invention during in-place operation.

FIG. 7 shows the "in-place" referencing mode of the present invention, possible only because the patch block method of the present invention 700 divides the target file 710 into blocks 720 that are processed independently. In this mode, each patch block is allowed to reference any part of the partially processed source/target file. Blocks can be processed in any order.

Figure 8:
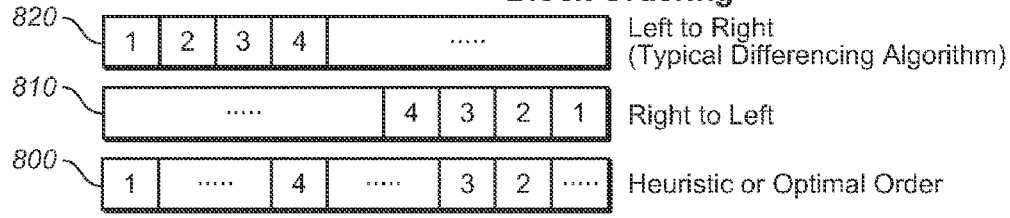
FIG. 8 is a schematic diagram showing three possible block ordering strategies.

Accordingly, and referring now to FIG. 8, there are shown three possible block ordering strategies, which are selected with the goal of minimizing the sum of the sizes of patch blocks, by either heuristic rules 800 or by exhaustive ordering search, right to left 810, or left to right 820, to ensure optimization.

Figure 9:
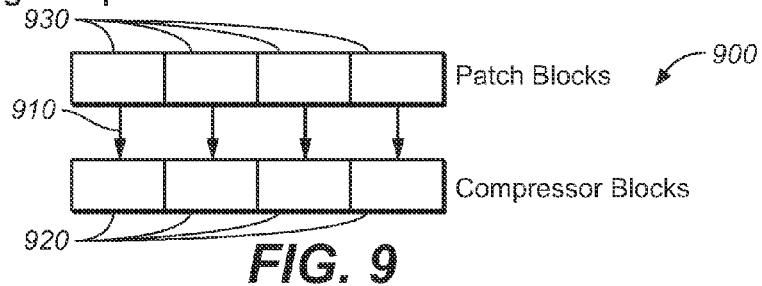
FIG. 9 schematically shows how the present invention matches patch block boundaries to compression block boundaries.

Finally, referring next to FIG. 9, there is shown the method of the present invention 900, which matches 910 the block sizes 920 of a second stage adaptive compression algorithm, such as the Burrows-Wheeler transform (also called BWT or block-sorting compression) to the patch blocks 930 of the differencing algorithm, ensuring that there is no misalignment of blocks and thus no performance loss.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A method of limiting memory required during differencing and patching, comprising the steps of:
    (a) applying a differencing algorithm that operates on finite-sized blocks created from at least one source/target file; and
    (b) adaptively determining block sizes as follows:
        (i) determining maximum block size based on the requirements of the differencing, compression, decompression and patching algorithms and the desired upper limit on memory requirements;
        (ii) when the number of source file blocks is small, adjusting the size of the blocks such that they are equally or similarly sized; and
        (iii) when the number of source file blocks is large, adjusting the size of the blocks for the last few blocks in a manner similar to (ii) above, thereby creating a similar effect as (ii), while maintaining the maximum block size for the majority of blocks.

2. The method of claim 1, wherein each of the finite-sized blocks is processed independently.

3. The method of claim 1, further including the step of incrementally updating search data structures used to locate matching portions of the source/target files upon completion of each patch block.

4. The method of claim 1, further including the step of attaching to each block data relating to the size and position of that block.

5. The method of claim 1, further including the step of putting each block in place one at a time using a patching algorithm.

6. The method of claim 5, wherein each block may be processed out of order.

7. The method of claim 5, further including the step of using the differencing algorithm to select the order of block processing with the goal of minimizing the sum of the sizes of patch blocks using either heuristic rules or an exhaustive ordering search to ensure optimization.

8. The method of claim 1, wherein an in-place patching operation includes the step of allowing each patch block to reference any part of a partially processed source/target file.

9. The method of claim 1, further including the matching the block sizes used in the differencing algorithm with those used in a second stage adaptive compressor.

\* \* \* \* \*